United States Patent [19]

Berdahl et al.

[11] Patent Number: 4,855,391
[45] Date of Patent: Aug. 8, 1989

[54] HIGH TEMPERATURE STABLE POLYETHERIMIDES FROM OXYDIPHTHALIC DIANHYDRIDE AND A MIXTURE OF M- AND P-PHENYLENE DIAMINES AND DIAMINODIPHENYL ETHER

[75] Inventors: Donald R. Berdahl, Scotia; James A. Cella; Gary K. Shank, both of Clifton Park, all of N.Y.

[73] Assignee: General Electric Company, Schenectady, N.Y.

[21] Appl. No.: 201,817

[22] Filed: Jun. 3, 1988

Related U.S. Application Data

[63] Continuation-in-part of Ser. No. 95,982, Sep. 14, 1987, abandoned.

[51] Int. Cl.[4] ............................................. C08G 73/10
[52] U.S. Cl. .................................................... 528/188
[58] Field of Search ......................................... 528/188

[56] References Cited

U.S. PATENT DOCUMENTS

| | | | |
|---|---|---|---|
| 3,312,663 | 4/1967 | Sorenson | 528/26 |
| 3,326,851 | 5/1967 | Tocker | 528/17 |
| 3,349,061 | 10/1967 | Pruckmayr | 528/128 |
| 3,376,260 | 4/1968 | Fritz | 528/172 |
| 3,700,649 | 10/1972 | Boram et al. | 528/226 |
| 3,745,149 | 7/1973 | Serafini et al. | 528/353 |
| 4,720,539 | 1/1988 | Rabilloud et al. | 560/76 |

OTHER PUBLICATIONS

Bell, *Polymer Letters*, 5, 941–946 (1967).

*Primary Examiner*—John Kight
*Assistant Examiner*—Frederick Krass
*Attorney, Agent, or Firm*—William H. Pittman; James C. Davis, Jr.

[57] ABSTRACT

Polyetherimides are prepared from at least two diamines selected from the group consisting of o-phenylenediamine, m-phenylenediamine and 4-aminophenyl ether and a dicarboxyphenyl ether anhydride, or the esterification product thereof with a low molecular weight alkanol such as methanol. 3,4-Dicarboxyphenyl ether dianhydride is preferred. Said polyimides are tough, flexible and stable at high temperatures.

3 Claims, No Drawings

HIGH TEMPERATURE STABLE POLYETHERIMIDES FROM OXYDIPHTHALIC DIANHYDRIDE AND A MIXTURE OF M- AND P-PHENYLENE DIAMINES AND DIAMINODIPHENYL ETHER

This application is a continuation-in-part of copending application Ser. No. 95,982, abandoned filed Sept. 14, 1987.

This invention relates to polyimides, and more particularly to a novel class of tough, flexible polyetherimides having extremely high stability at elevated temperatures.

Polyimides are a class of synthetic resins notable for their high thermal and oxidative stability and solvent resistance. They are commonly prepared by the reaction of tetracarboxylic acid dianhydrides with diamines. An alternative method of preparation which is applicable to many polyimides is a multi-step sequence in which a tetracarboxylic acid dianhydride is first caused to react with an alcohol to form an ester intermediate, principally comprising a diester; said intermediate is caused to react with a diamine to form a polyimide precursor; and said precursor is then converted at relatively high temperatures to the polyimide.

Because of their advantageous properties, many polyimides show promise for the formation of filled composites for use in the fabrication of such articles as engine parts employed at high temperatures. The properties required for such composites include the aforementioned toughness and flexibility, as well as high temperature stability. In particular, it is frequently desired that the polyimides demonstrate minimum weight loss after prolonged periods in contact with air at temperatures above 350° C. A common test procedure for evaluating this property is to heat the material in air at 371° C. (700° F.) for 100 hours and then determine weight loss.

The present invention provides a class of novel polyetherimides which are tough and flexible, as well as thermally and oxidatively stable. Certain species thereof are highly stable at temperatures above 350° C.

Accordingly, the invention includes polyuretherimides which are free from olefinic groups and which consist essentially of structural units of at least two of the formulas

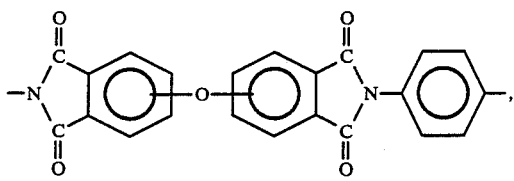

(I)

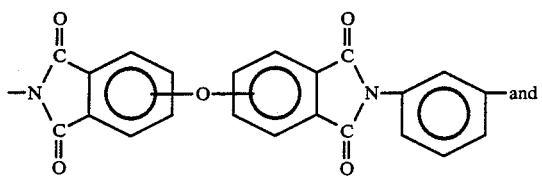

(II) and

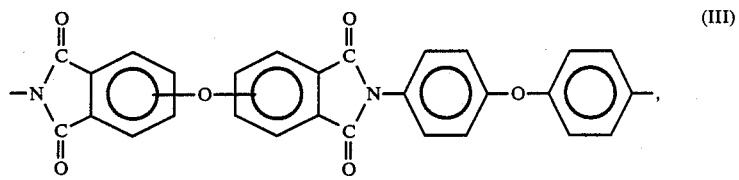

(III), each present in the proportions of about 25-75% by number. Particularly preferred are such polyetherimides containing equal proportions of units of formulas I and II or of units of formulas I, II and III.

The polyetherimides of this invention may be prepared by any method known in the art to be applicable to such polymers. In a commonly employed method, a dicarboxyphenyl ether dianhydride, preferably 3,4-dicarboxyphenyl ether dianhydride, is caused to react with a mixture of diamines selected from the group consisting of m-phenylenediamine, p-phenylenediamine and 4-aminophenyl ether, in solution in a dipolar aprotic solvent such as dimethylformamide, dimethylacetamide, dimethyl sulfoxide or N-methylpyrrolidone, to produce a polyamic acid intermediate. The aprotic solvent is then removed by evaporation and the intermediate is baked at temperatures above 300° C., whereupon it is converted to the desired polyetherimide.

A second method for preparing the polyetherimides of this invention, which is frequently preferred, involves the initial preparation of a polyetherimide precursor composition by blending, at a temperature up to about 50° C., reagents consisting essentially of:
(A) a diamine mixture as described hereinabove and
(B) the esterification product of the reaction of (B-1) at least one ether tetracarboxylic acid dianhydride of the formula

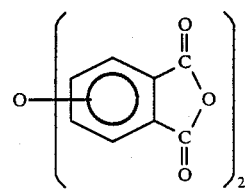

(IV)

and (B-2) at least one alkanol of the formula $R^1OH$, wherein $R^1$ is a $C_{1-4}$ primary or secondary alkyl radical; reagent B-2 being employed in the amount of about 10-20 moles per mole of reagent B-1.

Reagent B is the esterification product of at least one dicarboxyphenyl ether dianhydride (reagent B-1). Suitable compounds thus include the dianhydrides of 3,4-dicarboxyphenyl ether and 2,3-dicarboxyphenyl ether, with the dianhydride of the 3,4-dicarboxy compound generally being preferred. It is also known as 4,4'-oxydiphathalic anhydride and frequently referred to hereinafter as ODAN.

The esterification product of reagent B-1 is prepared by reaction thereof with at least one $C_{1-4}$ primary or secondary alkanol (reagent B-2). Thus, the suitable alkanols are methanol, ethanol, 1-propanol, 2-propanol, 1-butanol, 2-butanol and 2-methyl-1-propanol. Methanol is generally preferred by reason of its availability and particular suitability.

To form the esterification product, a solution of reagent B-1 in reagent B-2 is prepared, about 10–20 moles of reagent B-2 being present per mole of reagent B-1. This solution is then subjected to conventional esterification conditions, typically including heating at reflux, whereupon esterification takes place.

The principal product formed by the esterification is the diester of the tetracarboxylic acid with one carboxy group on each benzene ring esterified. Minor proportions of monoester, triester or tetraester may be present, but they are not believed to make a significant contribution. The facile formation of the desired diester is one reason for the necessity of employing dianhydrides as opposed to tetracarboxylic acids.

To prepare the polyetherimide precursor compositions, reagents A and B are blended in polyetherimide-forming proportions, typically in substantially equimolar amounts of reagents A and B-1 for a polyetherimide of high molecular weight. It is well known in the art that the proportions may be varied in order to control the molecular weight of the product. The incorporation in appropriate amounts of conventional endcapping agents for molecular weight control, such as phthalic anhydride or aniline, is within the scope of the invention.

In this method, the reaction mixture consists essentially of said reagents A and B; that is, that said reagents are the only ones which contribute materially to the novel and patentable features of the invention. Thus, the use of olefinic reagents, including endcapping agents, is not necessary and not contemplated.

Temperatures up to about 50° C., preferably about 20–35° C., are employed to form the polyetherimide precursor composition. At these temperatures, the principal product is believed to be a polymeric amine salt of the esterified tetracarboxylic acid. Its formation is generally evidenced by a noticeable thickening of the reaction mixture. The product thus produced is particularly adapted to the formation of composites by impregnation of typical fillers or reinforcing media such as glass fiber, polyester fiber, polypropylene fiber, cellulosics, nylon or acrylics.

The polyetherimide precursor compositions may be converted into polyetherimides by gently heating to remove excess alkanol by evaporation and form a prepolymer, and subsequently baking said prepolymer at a temperature in the range of about 275°–375° C. The temperature required to remove alkanol by evaporation will, of course, vary with the boiling point of the alkanol employed. Under many circumstances, it is convenient to increase the temperature in a single operation. As the temperature increases, alkanol is removed and a prepolymer is formed, principally by (at least in overall effect) dehydrating the polymeric amine salt to form a polyamic acid. With continued heating, the polyamic acid is itself dehydrated to form the desired polyimide.

The preparation of the polyetherimides of this invention is illustrated by the following examples, in which suitability for composite formation is evaluated in terms of the flexibility of a film formed in a glass plate. All parts are by weight.

EXAMPLE 1

A mixture of 3.3484 parts (10.79 mmol.) of 3,4-dicarboxyphenyl ether dianhydride and 4.7 parts (147 mmol.) of methanol was heated under reflux in a nitrogen atmosphere for 2½ hours, with stirring, whereupon a clear solution was formed. The mixture was cooled to room temperature and there were added a mixture of 0.3891 part (3.598 mmol.) of p-phenylenediamine, 0.3891 part (3.598 mmol.) of m-phenylenediamine and 0.7205 part (3.598 mmol.) of 4-aminophenyl ether. The mixture was stirred at room temperature under nitrogen for 2 hours to form the desired polyetherimide precursor composition.

The composition was coated onto glass plates with applicators to form films 4 mils and 2 mils thick. The plates were placed in an oven, maintained at 25° C. for 1 minute and heated at 25° C. per minute to 330° C., where they were held for 70 minutes. They were cooled to room temperature and immersed in boiling water to remove the films from the plates. The films were tough and flexible and had a glass transition temperature of 272° C.

EXAMPLE 2

Following the procedure of Example 1, tough and flexible films having a glass transition temperature of 272° C. were prepared from 3.2263 parts (10.40 mmol.) of 3,4-dicarboxyphenyl ether dianhydride, 4.3 parts (134 mmol.) of methanol, 0.5623 part (5.2 mmol.) of m-phenylenediamine and 0.5623 part (5.2 mmol.) of p-phenylenediamine.

Control samples were similarly prepared from equimolar amounts of 3,4-dicarboxyphenyl ether dianhydride and a single amine, either m-phenylenediamine or p-phenylenediamine. These films were very brittle and disintegrated when an attempt was made to remove them from the glass plate.

EXAMPLE 3

A solution of 1551.1 parts (5 mmol.) of 3,4-dicarboxyphenyl ether dianhydride and 270.4 parts (2.5 mmol.) each of m-phenylenediamine and p-phenylenediamine in 4880 parts of dimethylacetamide was stirred at room temperature in a nitrogen atmosphere for several hours and poured on a dry borosilicate glass plate. The glass plate was heated overnight at 65° C. under slight vacuum, in a nitrogen atmosphere, after which the film was heated in stages at temperatures from 100° to 330° C. to achieve complete solvent removal and imidization. The resulting polyetherimide film was tough and flexible, had a glass transition temperature of 294° C. and demonstrated a weight loss of only 1.1% upon heating for 100 hours at 371° C.

What is claimed is:

1. A polyetherimide which is free from olefinic groups and which consists essentially of structural units of at least two of the formulas

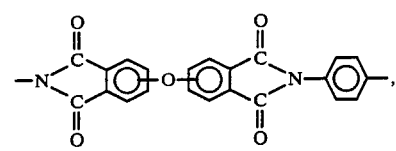 (II)
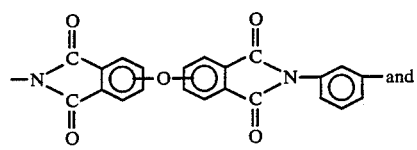 (III)
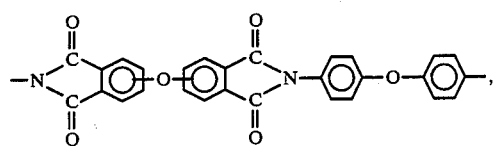 and
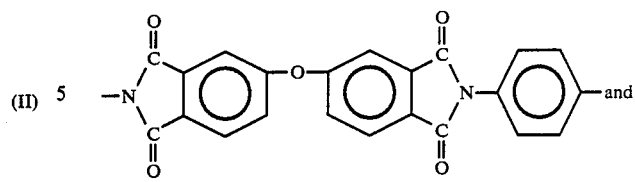 (IV)
each present in the proportions of about 25–75% by number.
2. A polyetherimide according to claim 1 which consists essentially of structural units having the formulas
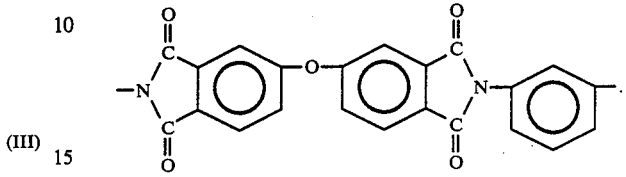
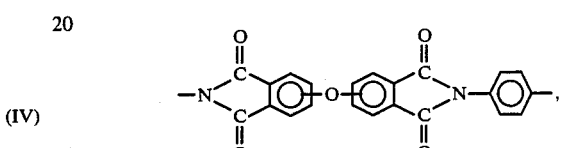
3. A polyetherimide according to claim 1 which consists essentially of structural units having the formulas
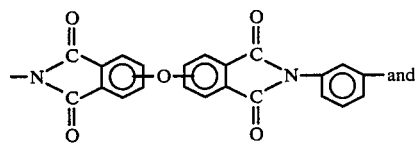
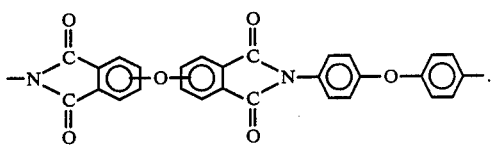
* * * * *